United States Patent [19]

Cardona et al.

[11] Patent Number: 4,600,929

[45] Date of Patent: Jul. 15, 1986

[54] APPARATUS FOR HANDLING PAPER IN A PRINTER

[75] Inventors: Ramon M. Cardona, Des Plaines; Kenneth W. Wiater, Palatine, both of Ill.

[73] Assignee: AT&T Teletype Corporation, Skokie, Ill.

[21] Appl. No.: 616,028

[22] Filed: Jun. 1, 1984

[51] Int. Cl.[4] .................... G01D 15/24; G03G 15/00; B65H 5/22; B65H 5/00

[52] U.S. Cl. .............................. 346/134; 355/14 SH; 271/4; 271/114

[58] Field of Search .............................. 346/134, 136; 355/14 SH; 271/116, 114, 10, 4

[56] References Cited

U.S. PATENT DOCUMENTS

| | | | |
|---|---|---|---|
| 3,642,271 | 2/1972 | Davis | 271/116 |
| 3,652,083 | 3/1972 | Bosshardt | 271/116 |
| 4,354,759 | 10/1982 | Bujese | 355/14 SH |
| 4,417,806 | 11/1983 | Tani | 355/14 SH |
| 4,475,732 | 10/1984 | Clausing | 271/10 |

*Primary Examiner*—E. A. Goldberg
*Assistant Examiner*—Mark Reinhart
*Attorney, Agent, or Firm*—W. K. Serp; A. A. Tirva

[57] ABSTRACT

A paper transport apparatus is illustrated which strips a single sheet of paper 16 from a stack 18 using a stripping roller 20 and cooperating fingers 22. The sheet of paper 16 is directed between the nip of a pressure roller 26 and a transfer roller 28. The transfer roller 28 is mounted on a drive mechanism 30 and is selectively positioned against a transfer drum 40 carrying an ink pattern by a cam 66, follower 72 and a spring 60 combination. The paper 16 is driven by the transfer roller 28 in contact with the drum 40 and discharged along a shelf 52 guided by a belt 50.

4 Claims, 7 Drawing Figures

APPARATUS FOR HANDLING PAPER IN A PRINTER

TECHNICAL FIELD

This invention generally relates to an apparatus for handling paper in a printer and more particularly relates to an apparatus for handling paper in a printer having an image transfer drum.

BACKGROUND OF THE INVENTION

In ink jet printers a stream of ink is directed at a medium to produce a pattern corresponding to the information to be printed. One such printer is described in copending U.S. patent application Ser. No. 497,386 entitled "Ink Jet Printer" filed May 23, 1983, by D. B. Durkee et. al. and having a common assignee with this application. As described in the referenced application, ink droplets are directed at the surface of a rotating transfer drum. The ink pattern deposited upon the drum is transferred to a sheet of paper which is brought into contact with the surface of the drum. The paper handling mechanism used in such printers must meet certain criteria. As described in the aforementioned application, the paper must initially contact the drum at a predetermined location to assure accurate positioning of the information on the paper. Physical contact between the drum and the components of the apparatus must be carefully controlled to prevent smearing of the ink image on the transfer drum. Additionally, upon transfer and for a short time thereafter, the ink is wet and thus contact between the surface of the paper and other objects must be avoided.

DISCLOSURE OF THE INVENTION

This invention relates to an apparatus for transporting single sheets of paper from a paper supply station into surface contact with a transfer drum and thereafter to a receiving station. The transfer drum has deposited thereon an ink pattern corresponding to the indicia to be printed. A selectively driven feed or stripping roller is in contact with a sheet of paper at a paper supply station and directs the sheet of paper toward a paper drive mechanism. The paper drive mechanism has a rest position and a transfer position whereat an image is transferred from the transfer drum to the sheet of paper. The paper drive mechanism includes a transfer roller coupled to a paper alignment roller by a drive belt. The transfer roller and drive belt define a paper path therebetween. The paper handling apparatus also includes means for selectively moving the paper drive mechanism from the rest position to the transfer position whereat a sheet of paper is pressed against the transfer drum by the indicia transfer roller and directed through the paper drive mechanism by the drive belt.

THE DRAWINGS

DETAILED DESCRIPTION

Figure 1:
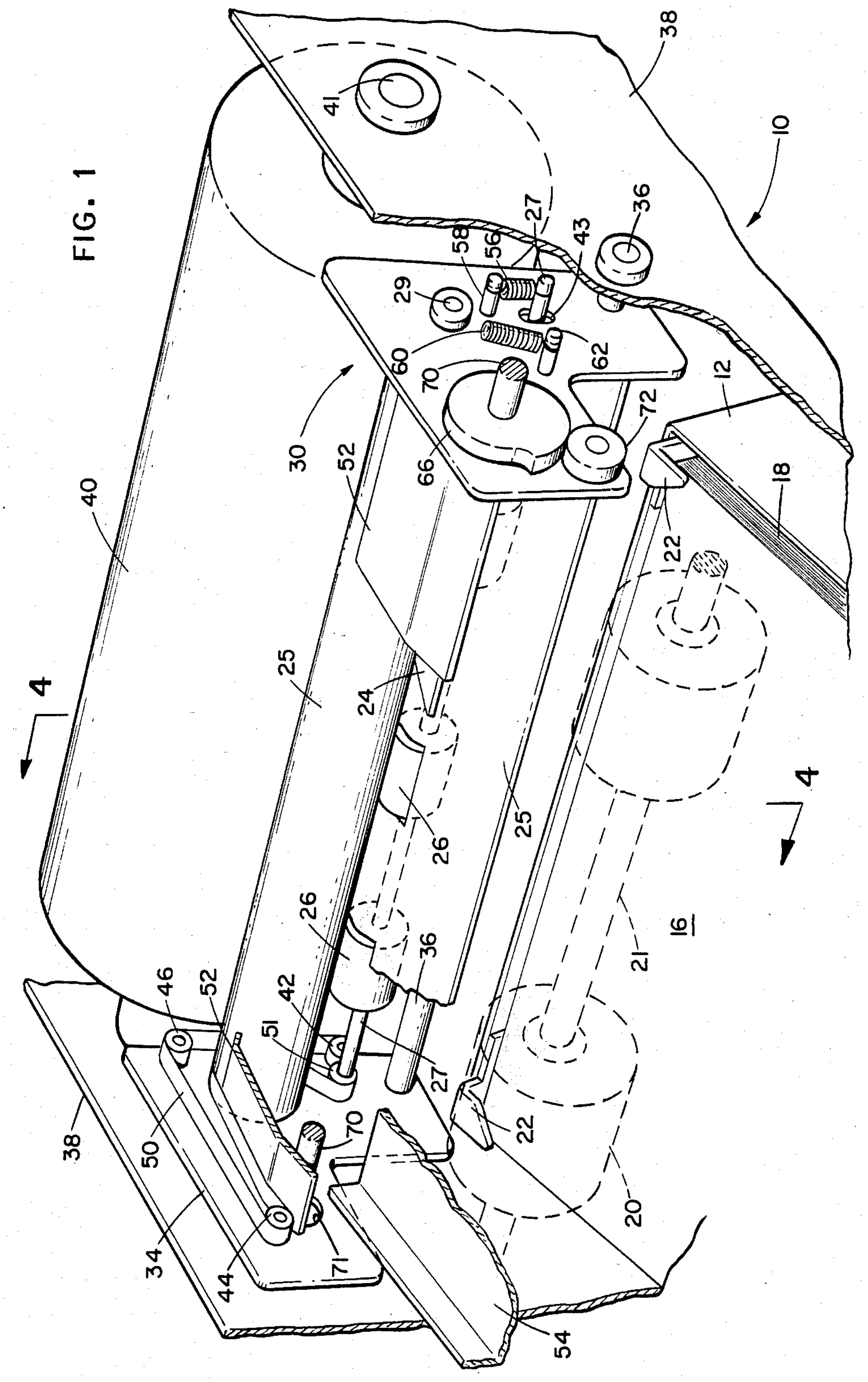
FIG. 1 is a perspective view of a portion of an ink jet printer including a paper handling apparatus incorporating certain features of this invention.

The printer 10, illustrated in FIG. 1, includes a paper supply station in the form of a storage tray 12. The tray 12 includes a platform 14 (FIG. 4) which is biased upwardly by a spring 15 forcing the top sheet 16 of a paper stack 18 against a stripping roller 20 supported on an axle 21 rotatably driven in the direction of the arrow 23. The outer surface of the roller 20 is coated with an easily deformable material providing high frictional coupling with the sheet of paper 16. The top of the paper stack 18 is pushed at its forward edge against a pair of stripping fingers 22. The fingers 22 provide sufficient resistance to the movement of the top sheet of paper 16 so that only a single sheet of paper will be moved from the stack at a time. The paper sheet 16 is deflected by a pair of guide plates 24, 25 to a position with the leading edge thereof forced against the nip of a segmented pressure roller 26 having an axle 27 and a transfer roller 28 having an axle 29 forming component parts of a drive mechanism 30. The stripping roller 20 continues to advance the paper sheet 16 until a bow is formed. The curl of the sheet 16 supplies the force necessary to maintain the sheet 16 against the nip of the rollers 26, 28 as illustrated in FIG. 5.

The drive mechanism 30 includes a pair of spacially positioned end plates 32, 34 supported for rotation about a pivot rod 36 fixed to the frame 38 of the printer 10. The pivot rod 36 is parallel to the axle 41 of rotation of an image transfer drum 40. The ends of the pressure roller shaft 27 are positioned through two elongated holes 43 in the end plates 32, 34. Additionally, mounted to the facing surfaces of the end plates 32, 34 are three spacially positioned guide rollers 42, 44, 46 about which a belt 50 is placed. The guide rollers 42, 44, 46 define an "L" shaped belt path with the rollers 26, 28 located within the acute angle defined by the "L" shaped belt path. The belt 50 passes over a small segment 51 of the pressure roller 26 and around the transfer roller 28 so that as the belt 50 moves, the rollers 26, 28 rotate in opposite directions. The relatively small diameter of the roller segment 51 as compared to diameter of the segments 26 assumes that the rollers 26 and 28 will remain in contact without interference from the belt 50. It should be noted that the sheet of paper 16 fed from the supply stack 18 will advance between the transfer roller 28 and the belt 50. Under guidance from the belt 50, the paper will move along a discharge shelf 52 to a receiving station in the form of a shelf 54.

Figure 3:
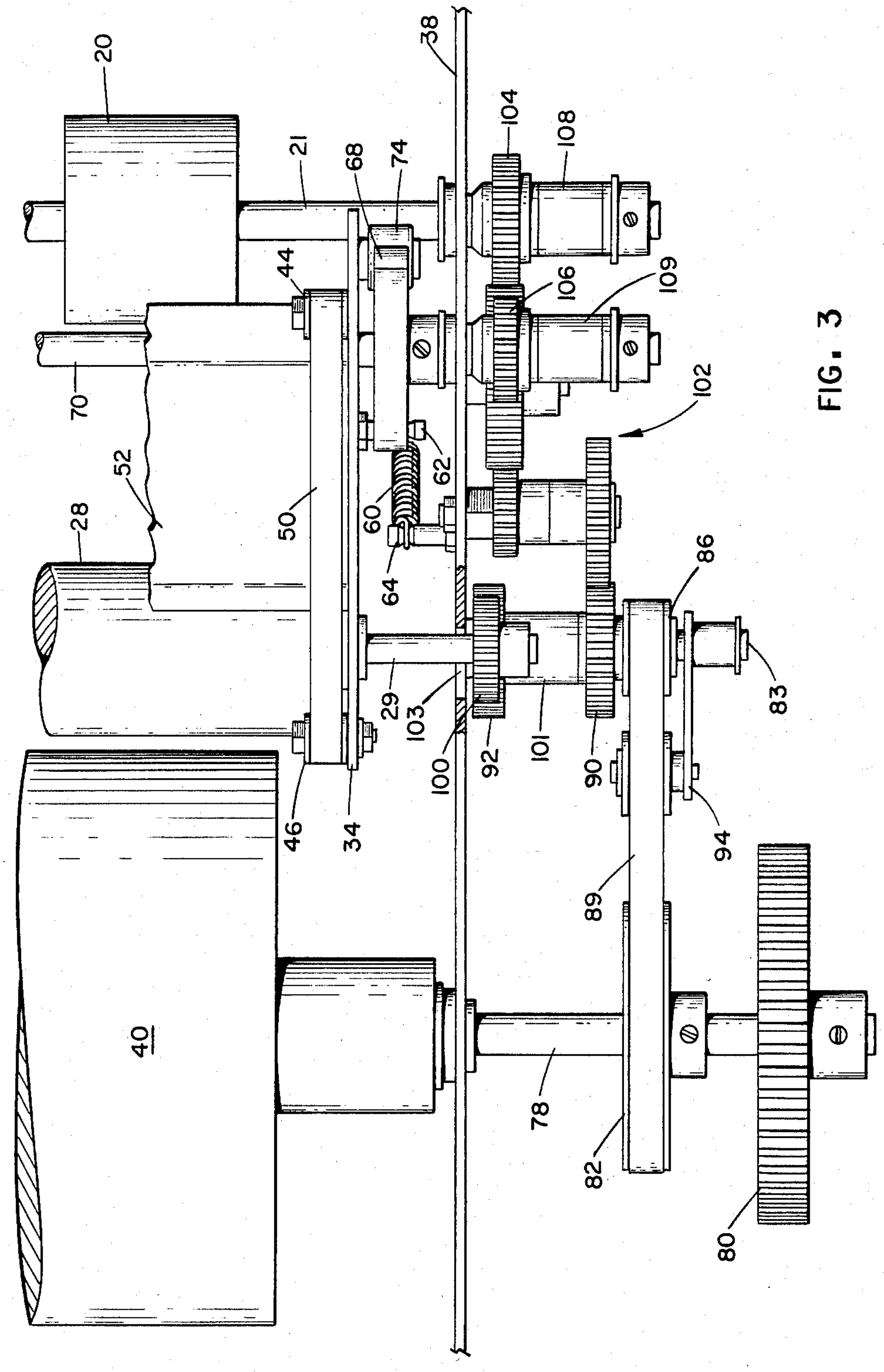
FIG. 3 is a top view of FIG. 2.
Figure 7:
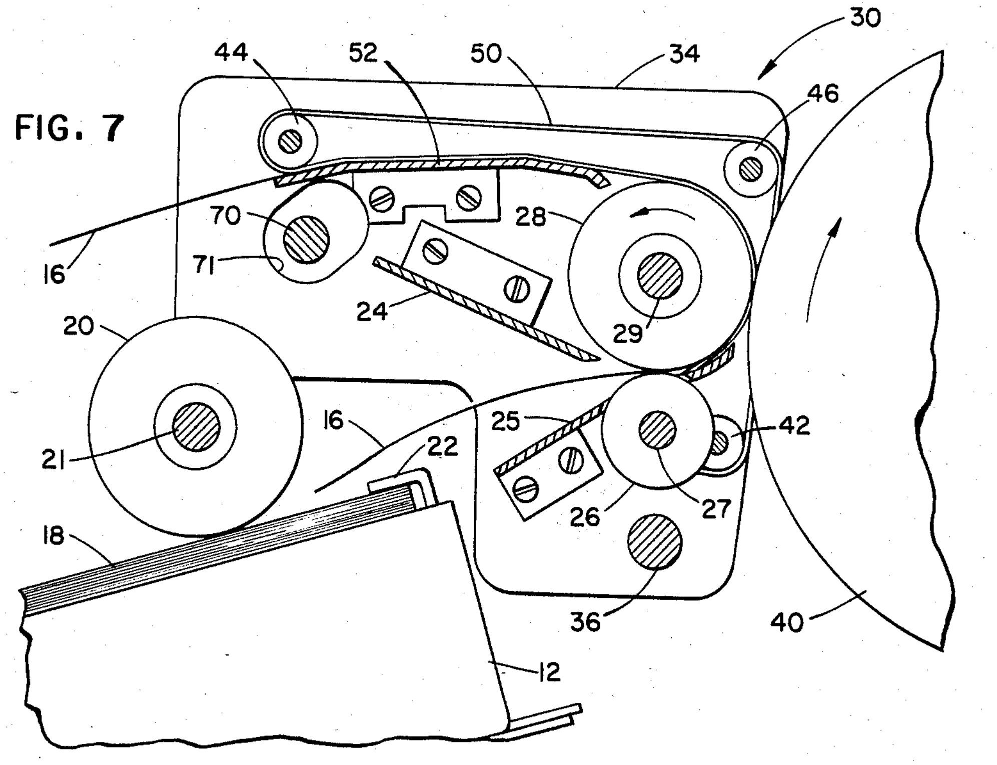
FIG. 7 is a right end view of the paper handling apparatus illustrated in FIG. 1 in a fourth operational mode.

As previously mentioned, each end of the pressure roller shaft 27 passes through an elongated hole 43 in the end plates 32, 34. Also, each end of the shaft 27 is cut with a groove which receives one end of a coil spring 56. The opposite ends of the coil springs 56 are secured to support studs 58 mounted upon the outwardly disposed surfaces of the end plates 32, 34. The springs 56 urge the roller 26 toward the transfer roller 28 thereby assuring contact between the two rollers. Additionally, located at the outwardly disposed surface of the end plates 32, 34 are coil springs 60 attached between respective stud pairs 62, 64. The stud 62 is fixed to the end plate and the stud 64 to the frame 38 of the printer 10 (FIG. 3). The coil springs 60 bias the paper mechanism 30 in a clockwise direction around the pivot rod 36 thus urging the transfer roller 28 toward the surface of the transfer drum 40. The drive mechanism 30 is positioned about the pivot rod 36 against the bias of the spring 60 by a pair of rotary cams 66, 68 mounted upon the ends of a cam shaft 70 supported by the frame 38 and passing through enlarged holes 71 in the end plates 32, 34. The cams 66, 68 respectively engage cam followers in the form of a roller bearing 72, 74 mounted on the outwardly disposed surfaces of the side plates 32, 34. As the cam shaft 70 rotates, the paper drive mechanism 30 rotates about the support rod 36 against the bias of the coil springs 60. The cams 66, 68 rotate the paper feed mechanism 30 about the support rod 36 between a paper loading position (FIG. 4) and a print position (FIG. 7).

Figure 2:
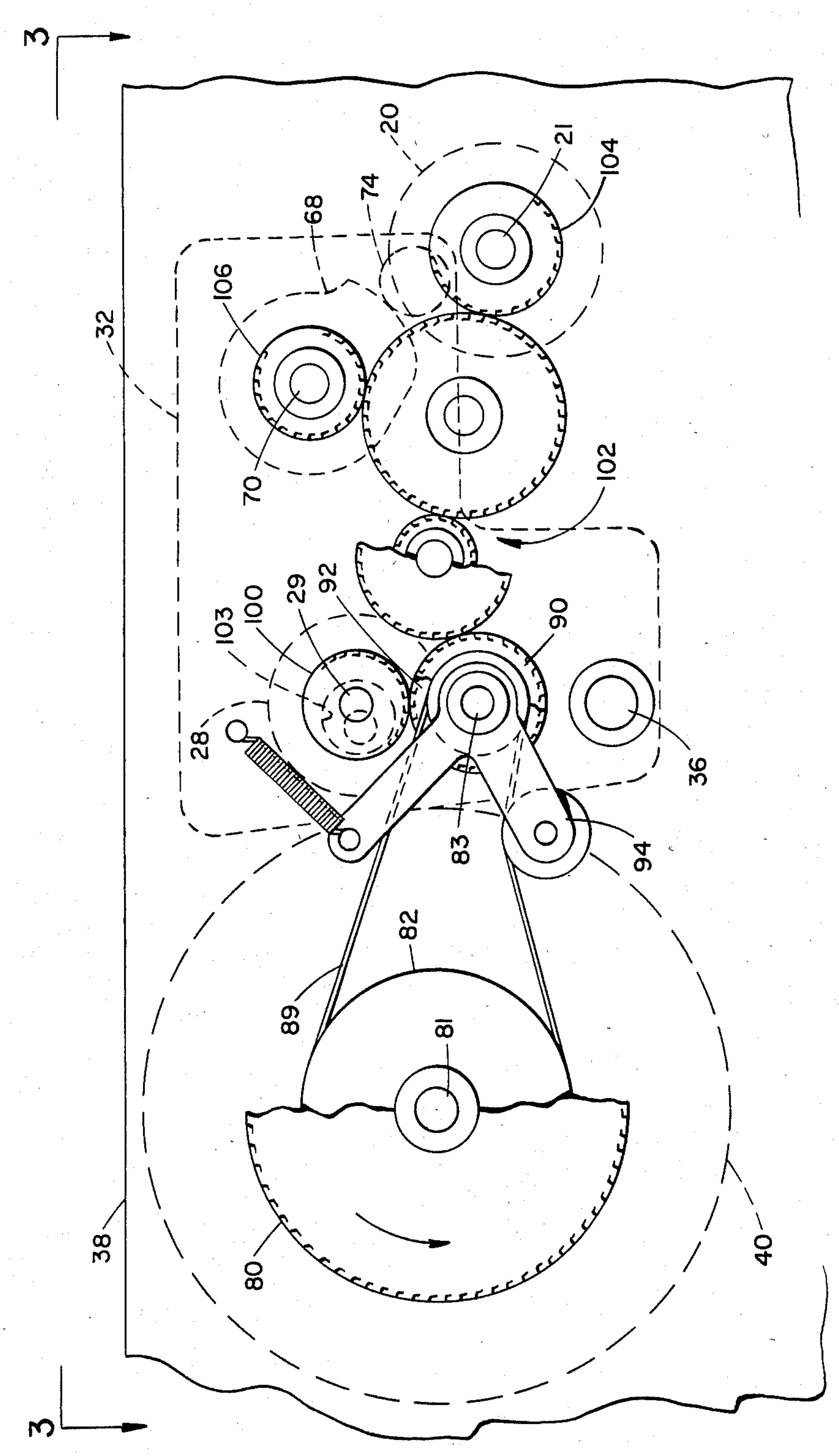
FIG. 2 is a left end view of the printer illustrated in FIG. 1.

As particularly illustrated in FIGS. 2 and 3, a motor (not shown) is coupled to a drive gear 80 mounted upon a transfer drum shaft 81 and a drive pulley 82 is also mounted upon the drum shaft 81. A support shaft 83 carries a driven pulley 86 as well as two gears 90, 92. The two pulleys 82, 86 are coupled by a belt 89. A belt tensioning assembly 94 maintains the belt 89 tension as the drive mechanism rotates about the support rod 36 between the drive and print positions. The driven gear 92 is coupled to a transfer roller gear 100 through an overrunning electrically operated clutch 101. The shaft of the transfer roller is positioned through oversized holes 103 in the end plates 32, 34 to allow movement of gear 100 about the driven gear 92 as the paper drive mechanism 30 rotates on the support rod 36. The gear 90 is coupled through a reducing idler gear assembly 102 mounted to the frame 38 of the printer 10, and the output of the idler gear assembly 102 engages a stripping roller gear 104 and a cam gear 106. The stripping roller gear 104 is coupled through a selectively operable overrunning electrical clutch 108 to the stripping roller axle 21, and the cam gear 106 is coupled through an electrically operable clutch 109 to the cam shaft 70.

Figure 4:
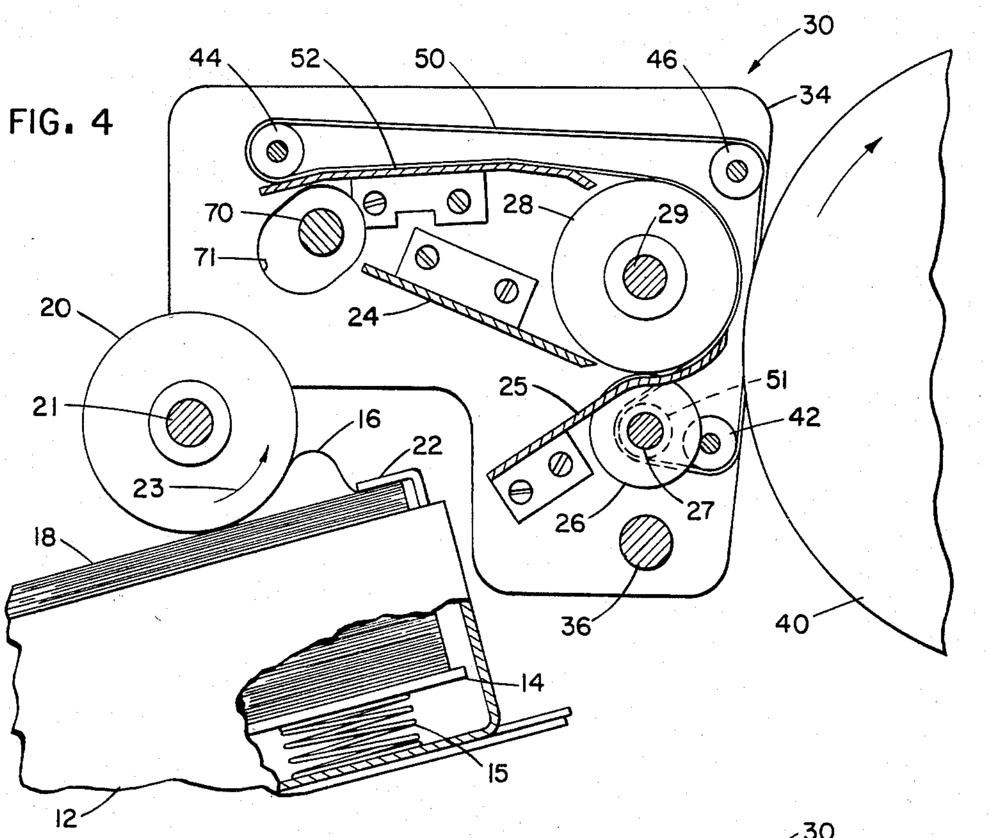
FIG. 4 is a right end view of the paper handling apparatus illustrated in FIG. 1 in a first operational mode.
Figure 5:
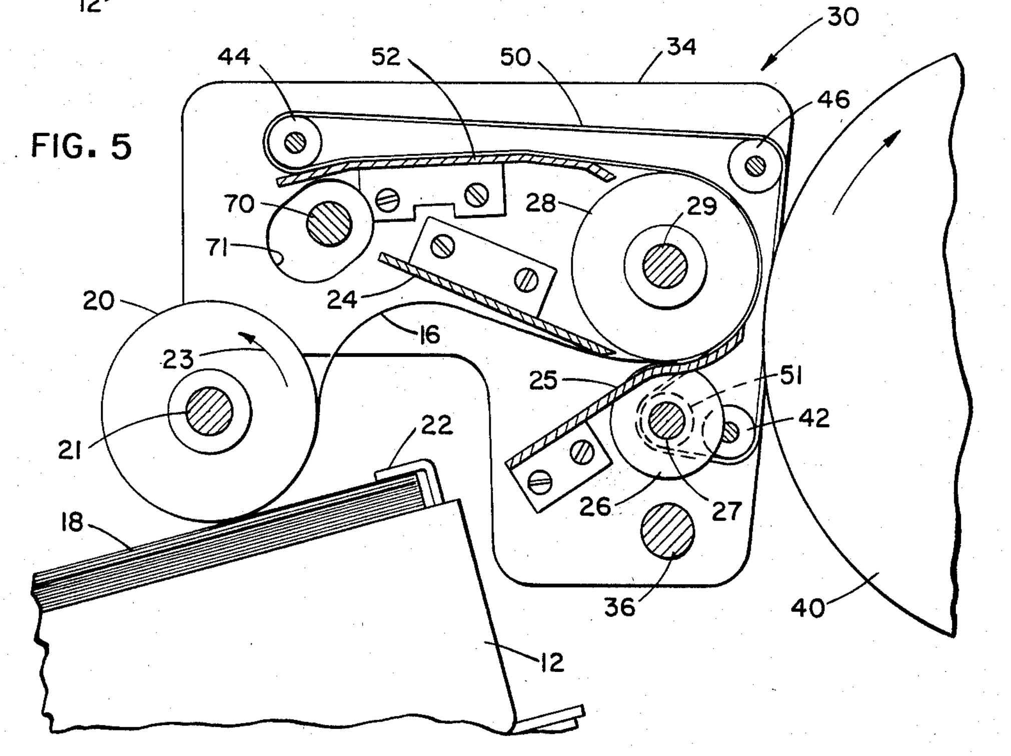
FIG. 5 is a right end view of the paper handling apparatus illustrated in FIG. 1 in a second operational mode.
Figure 6:
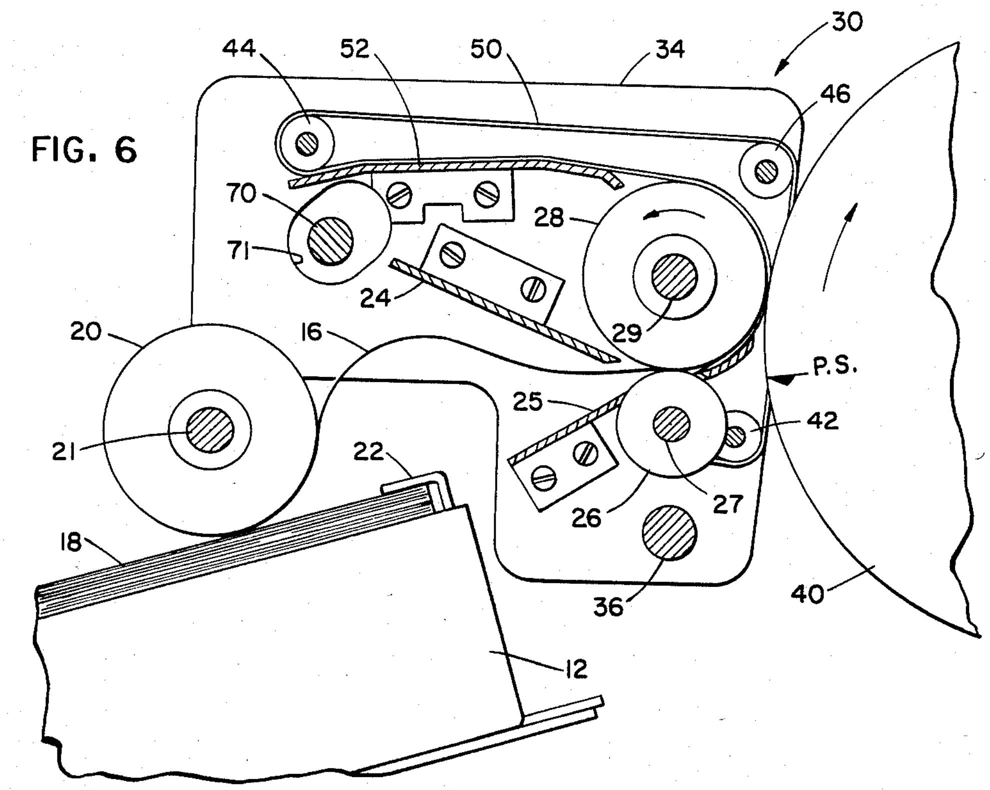
FIG. 6 is a right end view of the paper handling apparatus illustrated in FIG. 1 in a third operational mode.

The operational sequence of the paper feed mechanism 30 is illustrated in FIGS. 4, 5, 6, and 7. In FIG. 4, the stripping roller clutch 108 is actuated and the roller 20 drives the sheet of paper 16 forward causing it to buckle under the restraining influence of the stripping fingers 22. As the stripping roller 20 continues to rotate, the paper snaps away from the restraining fingers 22, is deflected by the plates 24, 25 into the position illustrated in FIG. 5. The forward edge of the paper is now forced against the nip of the rollers 26, 28. In this position, the rise of the cams 66 and 68 are adjacent their respective followers 72, 74; and the transfer roller 28 is withdrawn from the transfer drum 40. Ink is discharged onto the rotating transfer drum 40 in accordance with the image to be printed as described in the aforementioned copending patent application. The transfer roller clutch 108 is energized, and the transfer roller 28 rotates. As previously mentioned, the stripping roller 20 and transfer roller 28 are mounted on their respective axles 21, 29 by overrunning clutches 101, 108. As a result of the overrunning clutch 108 the stripping roller does not drive the paper 16 after the transfer roller 28 engages the paper since the drive speed of the transfer roller 28 is greater than that of the stripping roller 20. Subsequently, the cam clutch 109 is energized; and the cams 66, 68 rotate until the falls are adjacent to their respective followers 72, 74 forcing the transfer roller 28 against the rotating transfer drum 40 by bias springs 60 as illustrated in FIG. 6. Upon engagment of the transfer roller 28 and drum 40, the drum drives the transfer roller at a greater rotational speed than the gear 92 (FIG. 3) and the overrunning clutch 101 releases allowing the roller 28 to be freely driven by the drum 40. The transfer roller 28 advances the belt 50 causing the paper 16 to advance between the belt 50 and the transfer roller 28 and out along the discharge shelf 52. The start of the image deposited on the transfer drum 40 is indicated by the arrow designated P.S. (Print Start). Energization of the cam clutch 108 is in synchronization with the rotation of the transfer drum so that the paper will contact the transfer drum at the desired location for proper orientation of the printing on the paper 16. After the image is transferred to the paper 16, the paper 16 is discharged along the discharge shelf 52 storage shelf 54.

Although this invention has been particularly shown and described in connection with an illustrated embodiment, it will be understood that various changes in form and detail may be made without departing from the spirit and scope of the invention as set forth in the following claims.

What is claimed is:

1. An apparatus for transferring a sheet of paper from a paper supply station into contact with a transfer drum carrying an inked indicia pattern, and thereafter to a paper receiving station, comprising in combination:

(a) a base;

(b) a transfer drum carried by said base;

(c) a paper stripping roller spaced from said drum and carried by said base for delivering a sheet of paper from a stack at a paper supply station;

(d) a paper drive mechanism carried by said base, intermediate said roller and drum, for transporting said paper from the former to the latter, said paper drive mechanism having a rest position and a transfer position and including:

(i) a frame having a pivot rod affixed thereto and a pair of spaced side plates supported for rotation about said rod;

(ii) a paper transfer roller mounted between said plates;

(iii) a pressure roller mounted between said plates adjacent said transfer roller;

(iv) guide means for guiding said paper between said transfer and pressure rollers;

(v) a plurality of guide rollers for guiding said paper as it passes to said paper receiving station;

(vi) a belt positioned between said guide rollers and said transfer roller for maintaining said paper snugly against said transfer roller;

(vii) said guide rollers defining an "L" shaped belt path with said transfer roller and said pressure roller being disposed within an acute angle defined by said "L" shaped belt path;

(e) means for selectively moving said paper drive mechanism into and out of contact with said drum.

2. The apparatus of claim 1, wherein the rotational axes of said transfer drum and said transfer roller are parallel; and said belt is positioned about said transfer roller and a guide roller with said transfer roller and a guide roller rotating in opposite directions with the surface of said transfer roller engaging said belt being disposed toward said transfer drum so that a sheet of paper fed from said paper supply station will pass between said transfer roller and said belt and against said transfer drum.

3. The apparatus of claim 1, wherein said paper drive mechansim moving means comprises a cam, rotatably mounted on said base, and a cooperating cam follower secured to one of said side plates so that rotation of said cam engages said follower moving said drive mechanism in and out of contact with said drum.

4. The apparatus of claim 3 which further comprises means for biasing said paper drive mechanism toward said cam to assure contact between said cam and said follower.

* * * * *